United States Patent
Muthukesavaraj et al.

(10) Patent No.: US 11,080,463 B1
(45) Date of Patent: Aug. 3, 2021

(54) SCROLLING FOR MULTI-PLATFORMS

(71) Applicant: International Business Machines Corporation, Armonk, NY (US)

(72) Inventors: Vishnupriya Muthukesavaraj, Melbourne (AU); Maletsabisa Molapo, Pretoria (ZA); Enas Ahmed Zaki, Ismailia (EG); Hyman Chantz, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 16/740,062

(22) Filed: Jan. 10, 2020

(51) Int. Cl.
G06F 3/041 (2006.01)
G06F 40/103 (2020.01)
G06F 40/20 (2020.01)

(52) U.S. Cl.
CPC .......... G06F 40/103 (2020.01); G06F 40/20 (2020.01)

(58) Field of Classification Search
CPC .............................. G06F 40/103; G06F 40/20
USPC ......................................................... 715/254
See application file for complete search history.

(56) References Cited

U.S. PATENT DOCUMENTS

| | | | |
|---|---|---|---|
| 5,528,260 A * | 6/1996 | Kent | G06F 3/0485 345/684 |
| 9,030,419 B1 * | 5/2015 | Freed | G06F 3/0488 345/173 |
| 10,318,141 B2 | 6/2019 | Crowther et al. | |
| 2006/0059436 A1 | 3/2006 | Nurmi | |
| 2009/0007006 A1 | 1/2009 | Liu et al. | |
| 2014/0026055 A1 | 1/2014 | Cohn et al. | |
| 2014/0331169 A1 | 11/2014 | Dubey et al. | |
| 2017/0025096 A1 | 1/2017 | Fan et al. | |
| 2020/0349210 A1 * | 11/2020 | Kawamoto | G06F 11/3438 |
| 2020/0356590 A1 * | 11/2020 | Clarke | G06F 3/0485 |

OTHER PUBLICATIONS

"Technique for dynamically generating and displaying a page summary based on the scrolling speed"; an IP.com Prior Art Database Technical Disclosure; IP.com No. IPCOM000238016D; Jul. 25, 2014.

"Scroll-Speed—an Effective KPI for Measuring Content Consumption"; retrieved from https://www.globalmediainsight.com/blog/scroll-speed-effective-kpi/; Jun. 2017.

* cited by examiner

Primary Examiner — Hassan Mrabi
(74) Attorney, Agent, or Firm — Brown & Michaels, PC; Daniel Yeates

(57) ABSTRACT

Summarizing contents displayed on a screen of a device based on scroll speed of a user to decrease eye strain of a user by providing a summarization of the content being actively scrolled.

18 Claims, 5 Drawing Sheets

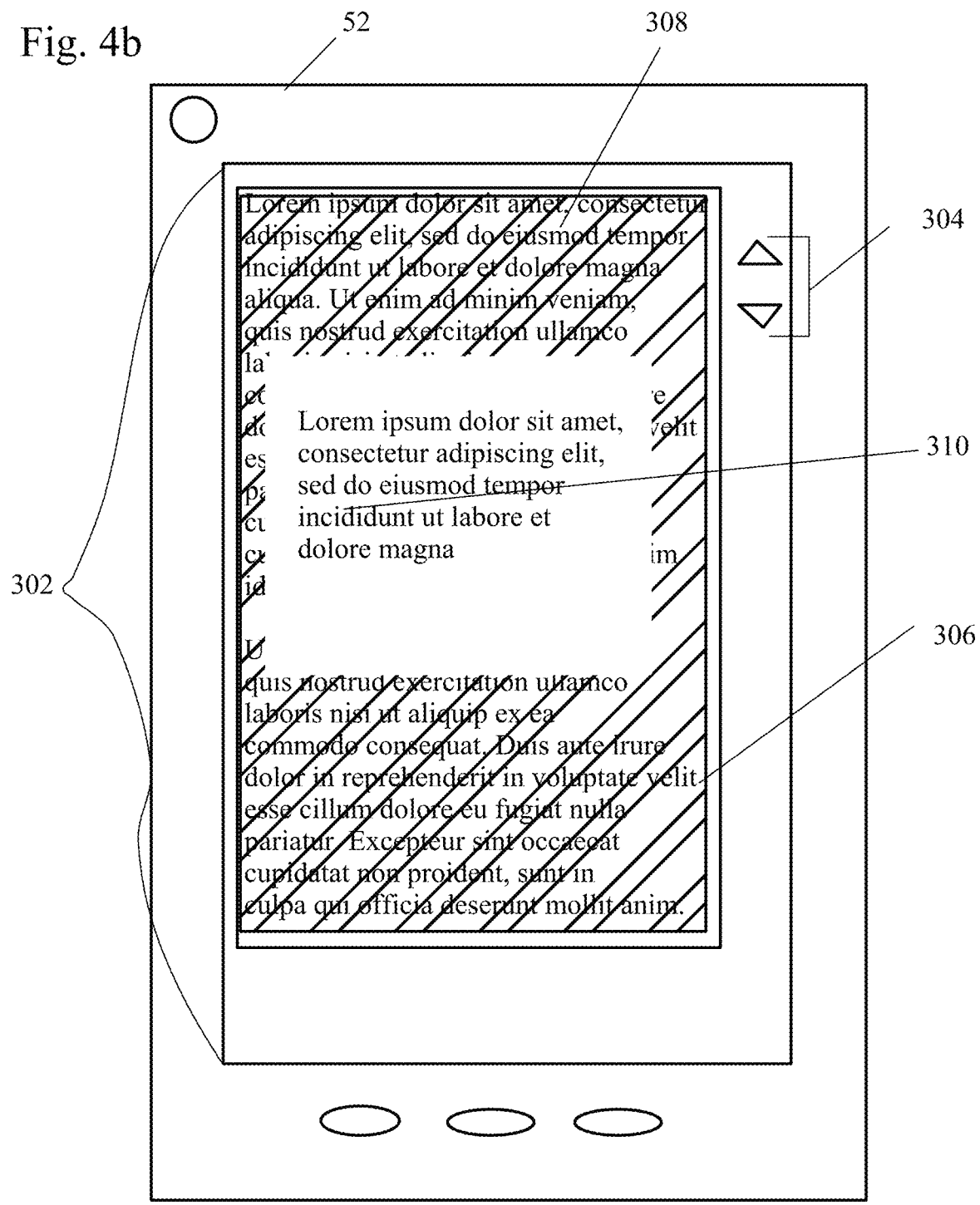

SCROLLING FOR MULTI-PLATFORMS

BACKGROUND

The present invention relates to information transfer, and more specifically to scrolling for multi-platform, enhanced, personal information transfer.

There are approximately 120 million rod cells primarily for detailed vision and 6 million cone cells primarily for color vision in the human eye. Optical images, once received in the eye, are processed by a complex system of brain functions to provide awareness and alerts and assist with learning and memory.

The human eye and associated brain functions are not optimized for "scrolling" in books, let alone computers or mobile devices through screens.

While an average page in a book may contain several hundred words, the average word count in a single display on a mobile device is approximately 90 words. While a user reads an article or text on a display of a mobile device, the user may scroll through the text at a pace that causes strain to the eyes of the user.

Conventional methods of viewing eye activity, as well as the use of virtual reality, typically involved up-down ("X-axis", or "azimuth"), and occasionally left-right ("Y-axis", or "altitude") tracking of eye movement. The tracking of the eye movement is carried out by scanners on a mobile device or other device. This method is oversimplified and is caused by actual 3-dimensional (3D) vision not being equivalent to the alignment of a user's two eyes, or the focusing of each of the eyes of the user, and is one of the reasons prior virtual reality and augmented reality implementations caused headaches, decreased concentration, and lack of information uptake. Plus, different colors are at different focal lengths, and hence there is a focusing adjustment in the eye depending on the colors of the text, picture etc. During actual viewing, for example of a book being held by the user, there is interrelated movement of the hand, the head and each eye.

SUMMARY

According to one embodiment of the present invention, a method of summarizing contents displayed on a screen of a device based on scroll speed of a user is disclosed. The method comprising the steps of: a computer of the device detecting scrolling of content displayed on the screen of the device; the computer of the device determining a scroll speed at which content is being scrolled relative to the screen of the device; the computer of the device determining that the scroll speed exceeds a threshold scroll speed; the computer of the device, in response to determining that the scroll speed exceeds the threshold scroll speed, determining a current reading speed of the user when the content is being scrolled; the computer of the device determining content being displayed on the screen during scrolling; the computer of the device retrieving summarized content representative of the content displayed on the screen during scrolling; and the computer of the device displaying the summarized content to the user.

According to another embodiment of the present invention, a computer program product for summarizing contents displayed on a screen of a device based on scroll speed of a user is disclosed. A computer of the device comprises at least one processor, one or more memories, one or more computer readable storage media, the computer program product comprising a computer readable storage medium having program instructions embodied therewith. The program instructions executable by the computer to perform a method comprising: detecting, by the computer, scrolling of content displayed on the screen of the device; determining, by the computer, a scroll speed at which content is being scrolled relative to the screen of the device; determining, by the computer, that the scroll speed exceeds a threshold scroll speed; in response to determining that the scroll speed exceeds the threshold scroll speed, determining, by the computer, a current reading speed of the user when the content is being scrolled; determining, by the computer, content being displayed on the screen during scrolling; retrieving, by the computer, summarized content representative of the content displayed on the screen during scrolling; and displaying, by the computer, the summarized content to the user.

According to another embodiment of the present invention, a computer system for summarizing contents displayed on a screen of a device based on scroll speed of a user is disclosed. The computer system comprising a computer comprising at least one processor, one or more memories, one or more computer readable storage media having program instructions executable by the computer to perform the program instructions. The program instructions comprising: detecting, by the computer, scrolling of content displayed on the screen of the device; determining, by the computer, a scroll speed at which content is being scrolled relative to the screen of the device; determining, by the computer, that the scroll speed exceeds a threshold scroll speed; in response to determining that the scroll speed exceeds the threshold scroll speed, determining, by the computer, a current reading speed of the user when the content is being scrolled; determining, by the computer, content being displayed on the screen during scrolling; retrieving, by the computer, summarized content representative of the content displayed on the screen during scrolling; and displaying, by the computer, the summarized content to the user.

BRIEF DESCRIPTION OF THE DRAWINGS

FIG. 4b shows a summary of the contents determined based on scroll speed of the user being displayed on the screen.

DETAILED DESCRIPTION

Figure 1:
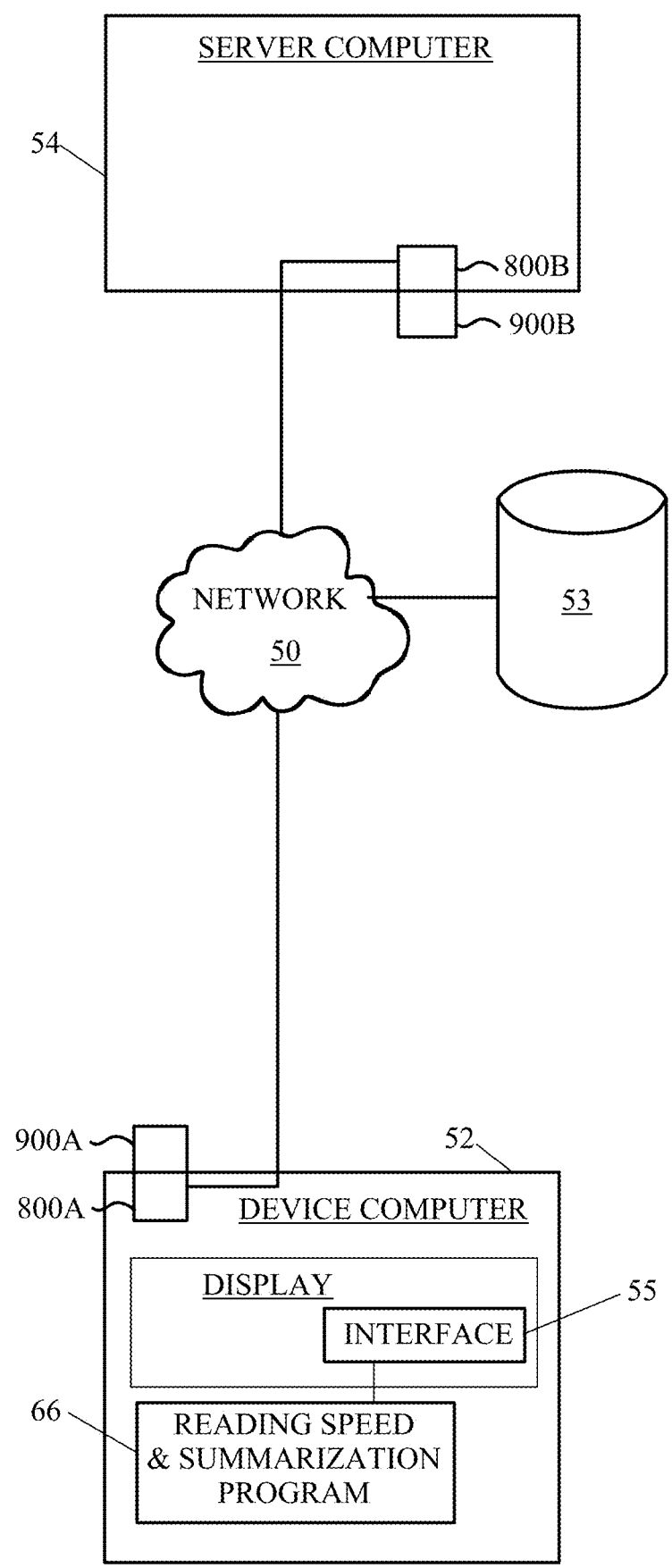
FIG. 1 depicts an exemplary diagram of a possible data processing environment in which illustrative embodiments may be implemented.

Embodiments of the present invention reduce eye strain by optimizing the information transfer rate to the user and making scrolling more amenable to reading.

In an embodiment of the present invention, feedback methods are used to summarize content being displayed on a screen, which are adjusted for image resolution of text displayed on the screen and according to the user's scroll speed. If the scroll speed is above a designated threshold of a user's approximate average scroll speed, the quantity of content that would have been displayed on the screen increases and the summary of content that was present in the text being scrolled by the user will be dynamically buffered and presented to the user to account for the quantity of content that would have been displayed. If the display includes images, the image resolution is adjusted according to the scroll speed. In some embodiments, scroll speed differentiation is determined by downloading a scroll rate from a server computer. Alternatively scroll speed is determined by downloading a scroll rate or an approximate average scroll rate from the server computer or in combination with manual control by the viewer on the display device. If the display speed is slow due to manual control (e.g. scrolling) by the viewer, the image may be expanded to include a top and side image extent bar, to allow a more detailed view of the image as presented. If the display speed is fast due to no manual slowing down or 'throttling' (scrolling) by the viewer, a smaller image is presented to be completely contained within the frame.

By providing a summary of the context present that was scrolled by the user, embodiments of the present invention reduce eye strain of a user because the eye movement of the user does not have to match the scrolling speed in which the user is scrolling. The amount of content summarized is based on user scroll speed.

In alternate embodiments, automatically tracking, and optimization of scrolling speed, by considering various methods of eye positioning, eye focus, and hand 'slewing' is improved.

Embodiments of the present invention preferably use languages with characters that can be represented as universal coded character set (UCS), which is a standard set of characters defined by the International standard ISO/IEC 10646 and is maintained in conjunction with the Unicode Standard. The languages are preferably capable of linear streamed output, for example, English, Hindi, Arabic, French, Spanish, Portuguese, German, Russian, Hebrew, Norwegian, Swedish, Finnish and Japanese Hiragana and Katakana. Other languages, not listed, may also be used.

In the present application, the following definitions apply:
Viewport—A viewport is a term for the visible area of a webpage on a display device. It is used in both code and analog design as a way to refer to the display screen and how layout fits into that screen.
Scrolling—To view consecutive lines of data on the display screen. The term scroll means that once the screen is full, each new line appears at the edge of the screen and all other lines move over one position. Scrolling does not change the layout of the text or images, but moves the user's view across what is a larger image that is not wholly seen by the user on the viewport. Scrolling can take place in discrete increments (one or a few lines of text at a time) or continuously.
Frame rate—The speed at which an entire image is redisplayed on a screen. Frame rate is related to scrolling in that, changes to text and image position can only happen as often as the image can be redisplayed. When frame rate is a limiting factor, one smooth scrolling technique is to blur images during movement that would otherwise appear to "jump".
Scroll distance—the distance that a web page or block of text, block of images, or block of images and text has been scrolled vertically or horizontally.
Scroll time—the time period between request for additional text or user requested manual import
Scroll speed—calculated by dividing "scroll distance" by "scroll time". Represented as words/minute or words per half minute. Scroll speed provides information regarding the threshold scroll speed and impacts reading speed of the user. The scroll speed is preferably an approximate average which is calculated over a course of time from the content which is being scrolled. From multiple scroll speeds, an average scroll speed may be calculated and an additional tolerance amount may be added to or subtracted from the average to determine the approximate average scroll speed.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, device computer 52, a repository 53, and a server computer 54 connect to network 50. In other exemplary embodiments, network data processing system 51 may include additional client or device computers, storage devices or repositories, server computers, and other devices not shown.

The device computer 52 may contain an interface 55, which may accept commands and data entry from a user. The commands may be regarding scrolling of text, images or a combination images/text. The interface can be, for example, a command line interface, a graphical user interface (GUI), a natural user interface (NUI) or a touch user interface (TUI). The device computer 52 preferably includes a reading speed and summarization program 66. While not shown, it may be desirable to have the reading speed and summarization program 66 be present on the server computer 54. The device computer 52 includes a set of internal components 800*a* and a set of external components 900*a*, further illustrated in FIG. 2. The device computer 52 may be mobile devices, portable devices, desktop devices, smart glasses, devices such as tablets for reading, or other devices that include a screen or viewport for reading text and/or images and associated programs that enable a scrolling function. The reading speed and summarization program 66 can additionally be part of web browser used on a device computer 52 by the user.

Figure 2:
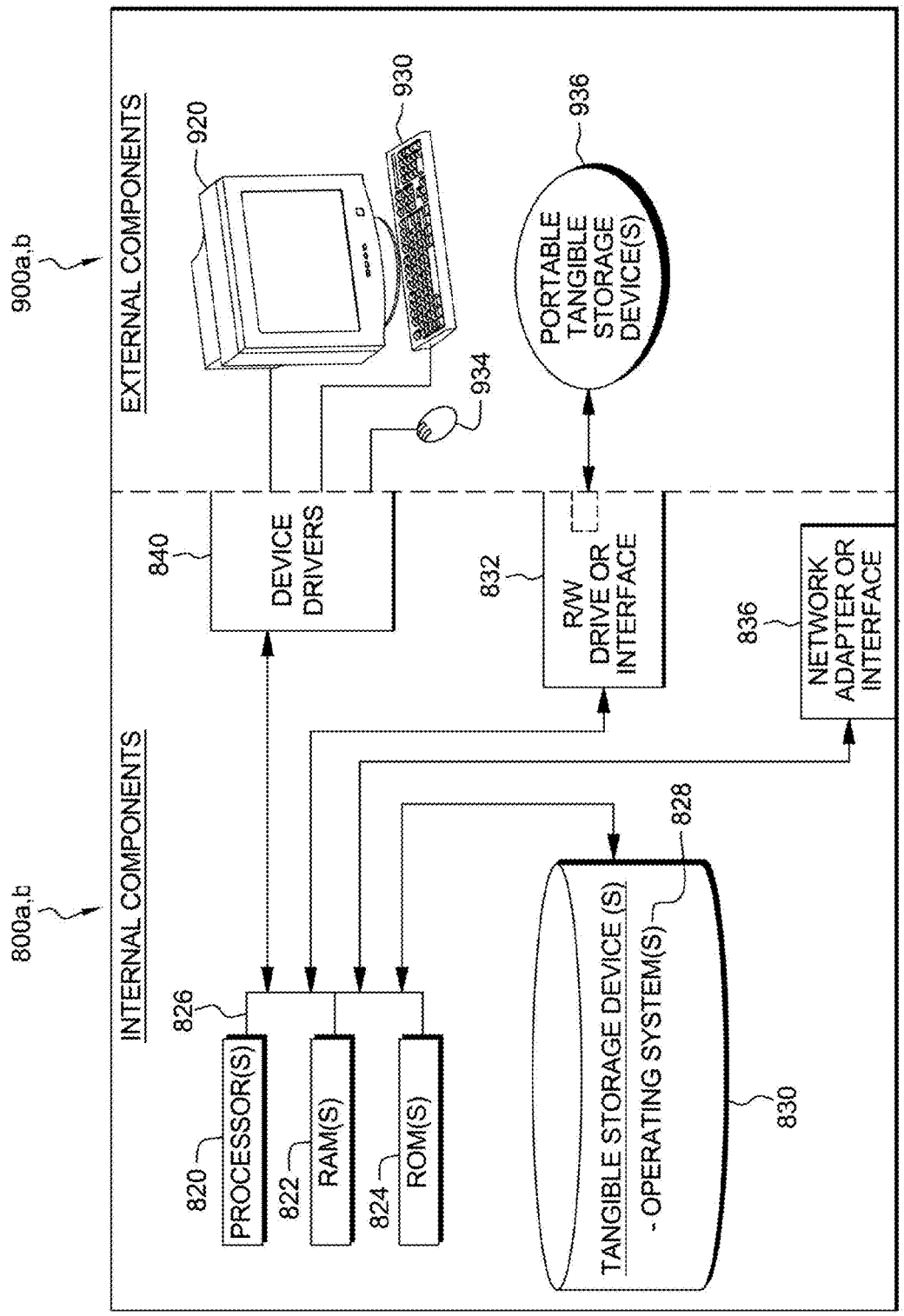
FIG. 2 illustrates internal and external components of a client computer and a server computer in which illustrative embodiments may be implemented.

Server computer 54 includes a set of internal components 800*b* and a set of external components 900*b* illustrated in FIG. 2. In the depicted example, server computer 54 provides information, such as boot files, operating system images, and applications to the device computer 52. Server computer 54 can compute the information locally or extract the information from other computers on network 50. The server computer 54 may contain the reading speed and summarization program 66.

Program code and programs such as reading speed and summarization program 66 may be stored on at least one of the one or more computer-readable tangible storage devices 830 shown in FIG. 2, on at least one of one or more portable computer-readable tangible storage devices 936 as shown in FIG. 2, or on storage unit 53 connected to network 50, or may be downloaded to a device computer 52 or server computer 54, for use. For example, program code and programs such as reading speed and summarization program 66 may be stored on at least one of one or more storage devices 830 on server computer 54 and downloaded to device computer 52 over network 50 for use. Alternatively, server computer 54 can be a web server, and the program code, and programs such as reading speed and summarization program 66 may be stored on at least one of the one or more storage devices 830 on server computer 54 and accessed device computer 52. In other exemplary embodiments, the program code, and programs such as reading speed and summarization program 66 may be stored on at least one of the one or more computer-readable storage devices 830 on device computer 52 or distributed between two or more servers.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

FIG. 2 illustrates internal and external components of a device computer 52 and server computer 54 in which illustrative embodiments may be implemented. In FIG. 2, a device computer 52 and a server computer 54 include respective sets of internal components 800a, 800b and external components 900a, 900b. Each of the sets of internal components 800a, 800b includes one or more processors 820, one or more computer-readable RAMs 822 (Random Access Memory) and one or more computer-readable ROMs 824 (Read Only Memory) on one or more buses 826, and one or more operating systems 828 and one or more computer-readable tangible storage devices 830. The one or more operating systems 828 and reading speed and summarization program 66 are stored on one or more of the computer-readable tangible storage devices 830 for execution by one or more of the processors 820 via one or more of the RAMs 822 (which typically include cache memory). In the embodiment illustrated in FIG. 2, each of the computer-readable tangible storage devices 830 is a magnetic disk storage device of an internal hard drive. Alternatively, each of the computer-readable tangible storage devices 830 is a semiconductor storage device such as ROM 824, Erasable Programmable Read Only Memory (EPROM), flash memory or any other computer-readable tangible storage device that can store a computer program and digital information.

Each set of internal components 800a, 800b also includes a Read/Write (R/W) drive or interface 832 to read from and write to one or more portable computer-readable tangible storage devices 936 such as a CD-ROM, DVD, memory stick, magnetic tape, magnetic disk, optical disk or semiconductor storage device. Reading speed and summarization program 66 can be stored on one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. Reading speed and summarization program 66 can be downloaded to the device computer 52 and server computer 54 from an external computer via a network (for example, the Internet, a local area network or other, wide area network) and network adapter or interface 836. From the network adapter or interface 836, reading speed and summarization program 66 is loaded into hard drive 830. Reading speed and summarization program 66 can be downloaded to the server computer 54 from an external computer via a network (for example, the Internet, a local area network or other, wide area network) and network adapter or interface 836. From the network adapter or interface 836, reading speed and summarization program 66 is loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Reading speed and summarization program 66 can be written in various programming languages including low-level, high-level, object-oriented or non object-oriented languages. Alternatively, the functions of a reading speed and summarization program 66 can be implemented in whole or in part by computer circuits and other hardware (not shown).

Figure 3:
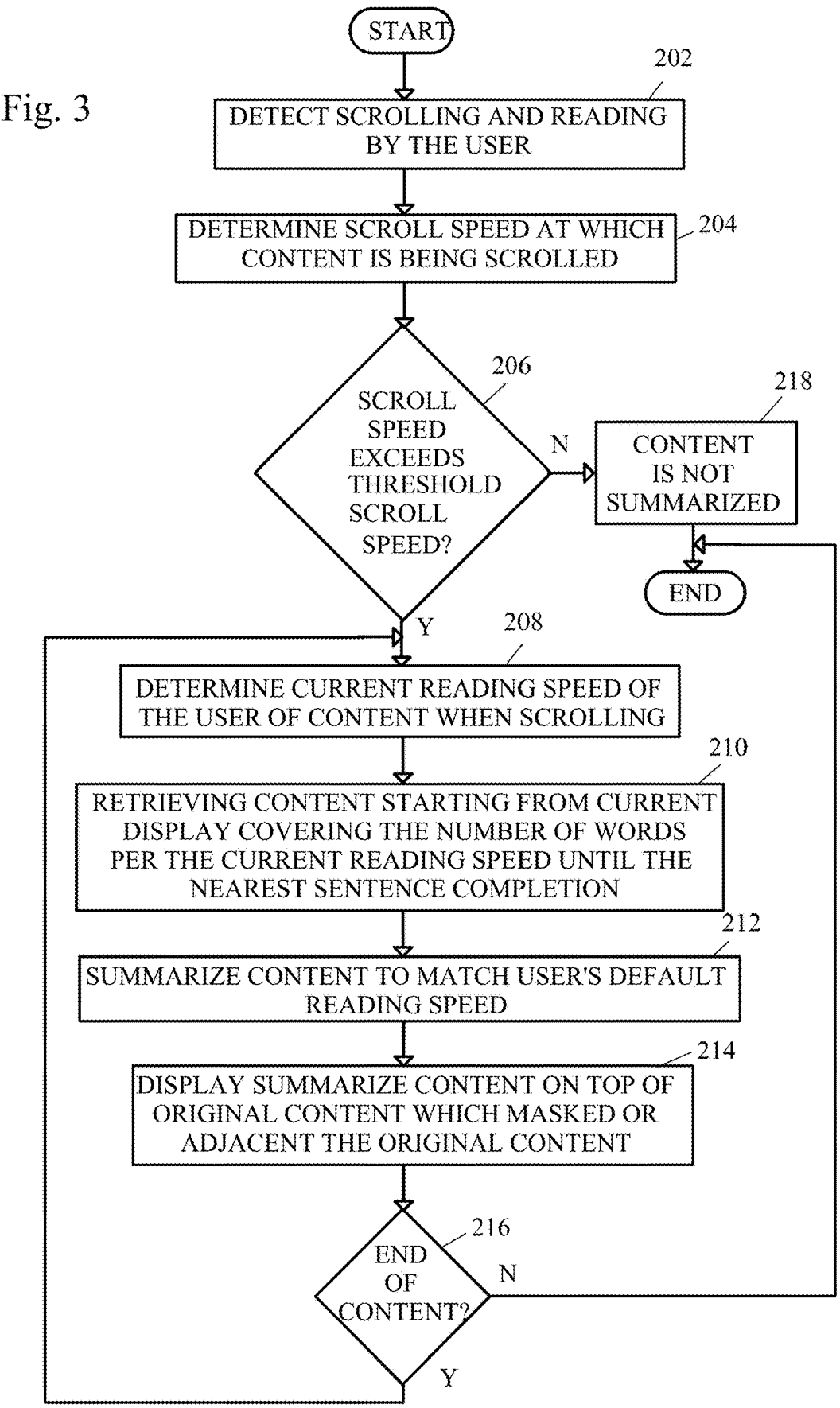
FIG. 3 shows a flow diagram of a method of summarizing contents based on scroll speed of a user.

FIG. 3 shows a flow diagram of a method of summarizing contents based on scroll speed of a user.

Prior to the method of FIG. 3, the reading speed and summarization program 66 preferably determines an individual user's default reading speed (r) in words per minute. This step is preferably carried out one time for each user relative to their device computer 52. The user's average reading speed can be determined by providing a same sample paragraph to the user to read and tracking the time it takes for the user to read the paragraph and then calculating the number of words read, by the user, per minute.

In a first step (step 202), the reading speed and summarization program 66 detects scrolling and reading by the user of content consisting of images and/or text by the user on the viewport or display of the user.

Next, the scroll speed at which content is scrolled is determined (step 204), for example, by the reading speed and summarization program 66.

The scroll speed can be determined in various methods available in scripting languages. Scroll speed can be a manual input received from a server computer. Additionally, accelerometers and position indicators of the device computer may display an anomalous or usual left-right and/or up-down motion by the device computer. This anomalous function may be calibrated by noting the positional information and stability in most non-reading instances. When this anomalous activity exceeds a threshold, scroll speed will be decreased. In an alternate embodiment, scroll speed and reading speed can be identified by using sensors of the device that track a user's eye movement. Other methods can also be used to identify the user's reading speed and scrolling speed through pupil dilation and brainwave measurements and rotation of the head relative to a fixed point.

In addition to determining the scroll speed in which content is being scrolled via sensors of the device computer 52, the sensors of the device computer 52 can also determine vertical movement of the device computer via accelerometers and whether optimum reading is taking place. For example, if a device computer, such as a smartphone, is slightly below a user's perspective, this can indicate that the scrolling is too fast, and the person wishes to linger on the page segment. Alternatively, if the smartphone is slightly moved up, this can indicate that the scrolling is too slow, and the user consciously or unconsciously is impatient and wishes to 'speed' up the content present on the display. Additional sensors can also determine horizontal movement through accelerometers. For example, if the user who is concentrating typically places an object towards the middle of their torso for closer observation. The horizontal movement detected can indicate that scrolling temporarily slowed then advanced.

In an alternate embodiment, changes in scroll speeds can be determined as well. Since the largest differential in eye focus is between violet and red, users will often scroll slower to allow for a refined focus to take place due to the high differential in colors being displayed. In some embodiments, scroll speed can be automatically slowed if a high differentiation between the highest-frequency light (violet) and the lowest frequency (red) is detected. The automatic slowing of scroll speed may be used in aiding the viewing for users with cognitive or muscle disorders, cataracts or focusing/collimation difficulties.

An approximate average scroll speed of a user can be determined over a course of time from the content which is being scrolled. From multiple scroll speeds, an average scroll speed may be calculated and an additional tolerance amount may be added to or subtracted from the average to determine the approximate average scroll speed. The approximate average scroll speed may be determined in lines per half minute or words per half minute or any other time delineation.

If the scroll speed of the content being scrolled does not exceed a threshold scroll speed, (step 206), then the content is not summarized and the method ends or can return to the monitoring step 202. The threshold scroll speed is preferably an approximate average scroll speed, which can be a specific increment greater than the user's default reading speed, or equal to the user's default reading speed. Alternatively, the user's default reading speed can be predetermined to be anywhere within the range of 200-215 words per minute.

If the scroll speed of the content being scrolled exceeds a threshold scroll speed (step 206), then the current reading speed of the user of the content when scrolling is determined (step 208).

Then, the content, starting from the current viewport, or starting from the current content being displayed on the screen covering the number of words per the current reading speed until the nearest sentence completion is retrieved from a repository, such as repository 53 (step 210). Next, the contents are summarized to match the user's default reading speed (step 212), for example, by the reading speed and summarization program 66. In other words, the first word displayed on the screen of the device, or the view port, to the nearest sentence completion of the last word displayed on the screen is the content which is summarized. The text summarization preferably summarizes the content to target the size of the content being scrolled in terms of the number of characters. The repository can be populated with summarized points which were designated by the author of the document currently being read by the user, or through natural language processing, application program interfaces (APIs), or other processors. In an alternate embodiment, the repository can be a central or distributed database which can recognize an individual's reading patterns and present summarized information that would relevant to that particular user. In yet another embodiment, the repository can be a temporary cache.

The summarized content is then displayed on top of the original content which is masked or adjacent the original content (step 214). The summarized contents can be presented to the user in a few sentence fragments, bullet points, or other shortened phrases. It should be noted that the summarized content is of a length and number of words that that can be read by the user at the user's default reading speed as the user continues to scroll.

If the end of content is reached (step 216), the method ends.

If the end of the content has not been reached (step 216), the method returns to step 208 of determining the current reading speed of the user of the content during scrolling. It should be noted that end of content is referencing the end of an article, website, book, magazine, or break that indicates that no additional content is present.

Example

A user's default or threshold reading speed is 215 words/min as determined after having a user read a standard paragraph through recording the time it takes the user to read the paragraph divided by the number of words present in the paragraph.

While the user is using their smartphone, the reading and summarization program 66, for example, determines that the user is scrolling text being displayed, at an average approximate scroll speed of 500 words/minute. Since the user's determined average approximate scrolling speed of 500 words/minute is greater than the user's threshold scroll speed of 250 words/minute, and the current reading speed of the user in words/minute with scrolling would be 512 words/minute, the contents are fetched from a repository, or determined, through a summarization API that would cover the content associated with the number of words as per the current reading speed of 512 words per minute, until the nearest sentence completion (covering a total of 525 words). The content is summarized to reflect the contents of the 525 words in a summarization that can be read by the user at the user's default reading speed of 215 words/minute. The summarized content is displayed to the user overlaying the original content being scrolled on the viewport of the device. Once scrolling ceases, the summarized content would be removed.

Figure 4A:
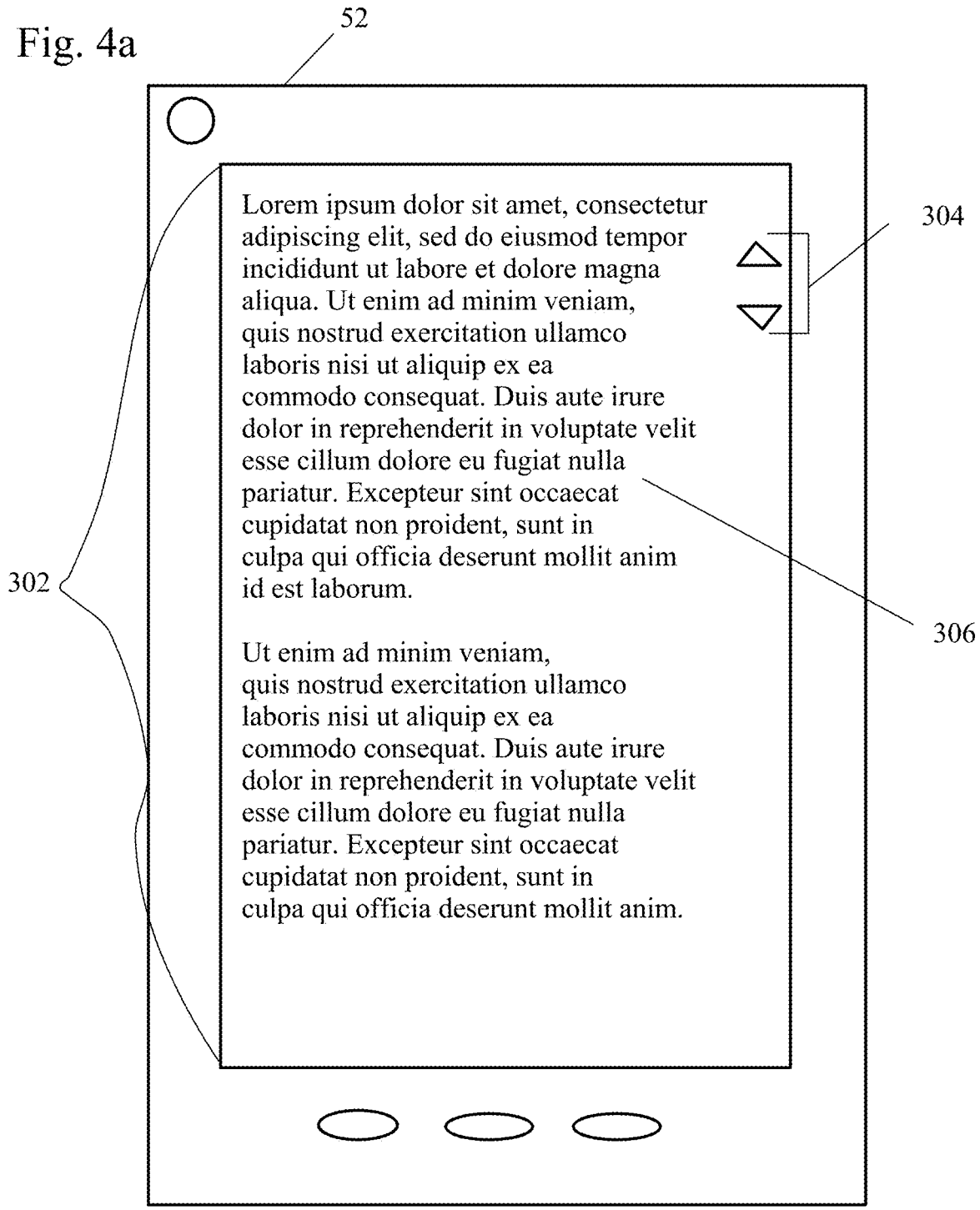
FIG. 4a shows a schematic of a device with content being displayed on a screen.

FIG. 4*a* shows a schematic of a device with content being displayed on a screen. The device computer 52 includes a display with a screen 302. The display includes text 306 as well as a mechanism 304 for the user to initiating scrolling. While the mechanism 304 is indicated as being two arrows for scrolling on the device computer 52, any means known to the art can be used, including a separate device that is connected to the device computer 52 or a combination of interactions by the user with the device computer or the display.

FIG. 4*b* shows a summary of the contents determined based on scroll speed of the user being displayed on the screen. The summary of the content within the overlay 310 representing the content being scrolled is displayed, in this case, on top of the contents being scrolled, while the contents being scrolled are masked 308. The summary overlay 310 of the content can be updated as the user continues to scroll through content. Once scrolling is stopped, the summary overlay 310 is removed.

It is noted that the default reading speed and thus the threshold in which text is summarized based on scroll speed can be customized for users to additionally account for neuro-visual issues as well as being used to improve a user's cognitive ability.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of summarizing contents displayed on a screen of a device based on scroll speed of a user comprising the steps of:
   a computer of the device calculating words per minute read of the user based on a paragraph with a known number of words;
   the computer of the device detecting scrolling of content displayed on the screen of the device;
   the computer of the device determining a scroll speed at which content is being scrolled relative to the screen of the device;
   the computer of the device determining that the scroll speed exceeds a threshold scroll speed;
   the computer of the device, in response to determining that the scroll speed exceeds the threshold scroll speed, determining a current reading speed of the user when the content is being scrolled;
   the computer of the device determining content being displayed on the screen during scrolling;
   the computer of the device retrieving summarized content representative of the content displayed on the screen during scrolling; and
   the computer of the device displaying the summarized content to the user over the content displayed on the screen of the device being scrolled by the user, masking the content being scrolled.

2. The method of claim 1, wherein the content is text, images, or text and images.

3. The method of claim 1, wherein prior to the step of the computer of the device detecting scrolling of content displayed on the screen of the device, the computer of the device determining a user's default reading speed by presenting a paragraph with a known number of words, receiving an indication of the time necessary for the user to read the paragraph.

4. The method of claim 1, wherein the scroll speed is determined by sensors of the device.

5. The method of claim 4, wherein the sensors are tracking a user's eye movement.

6. The method of claim 4, wherein the sensors are accelerometers tracking at least one of vertical movement or horizontal movement.

7. The method of claim 1, wherein the threshold scroll speed is equal to a user's default reading speed.

8. The method of claim 1, wherein the threshold scroll speed is greater than a user's default reading speed plus a determined increment.

9. The method of claim 1, wherein the summarized content is of a length to be read by the user at a user's default reading speed.

10. The method of claim 1, wherein the summarized content is provided by an author of the content and stored in a repository.

11. The method of claim 1, wherein the summarized content is determined through natural language processing via an application program interface.

12. A computer program product for summarizing contents displayed on a screen of a device based on scroll speed of a user, a computer of the device comprising at least one processor, one or more memories, one or more computer readable storage media, the computer program product comprising a computer readable storage medium having program instructions embodied therewith, the program instructions executable by the computer to perform a method comprising:
   calculating, by the computer, words per minute read of the user based on a paragraph with a known number of words;
   detecting, by the computer, scrolling of content displayed on the screen of the device;
   determining, by the computer, a scroll speed at which content is being scrolled relative to the screen of the device;
   determining, by the computer, that the scroll speed exceeds a threshold scroll speed;
   in response to determining that the scroll speed exceeds the threshold scroll speed, determining, by the computer, a current reading speed of the user when the content is being scrolled;
   determining, by the computer, content being displayed on the screen during scrolling;
   retrieving, by the computer, summarized content representative of the content displayed on the screen during scrolling; and
   displaying, by the computer, the summarized content to the user over the content displayed on the screen of the device being scrolled by the user, masking the content being scrolled.

13. The computer program product of claim 12, wherein prior to the program instruction of detecting, by the computer, scrolling of content displayed on the screen of the device, determining, by the computer, a user's default reading speed by presenting a paragraph with a known number of words, receiving, by the computer, an indication of the time necessary for the user to read the paragraph and calculating, by the computer, words per minute for the user.

14. The computer program product of claim 12, wherein the scroll speed is determined by sensors of the device.

15. The computer program product of claim 12, wherein the threshold scroll speed is equal to a user's default reading speed.

16. The computer program product of claim 12, wherein the threshold scroll speed is greater than a user's default reading speed plus a determined increment.

17. The computer program product of claim 12, wherein the summarized content is of a length to be read by the user at a user's default reading speed.

18. The computer program product of claim 12, wherein the summarized content is provided by an author of the content and stored in a repository.

* * * * *